May 11, 1926.
C. GOTTSCHALK
CORD WOOD SAW
Filed August 1, 1921
1,584,029
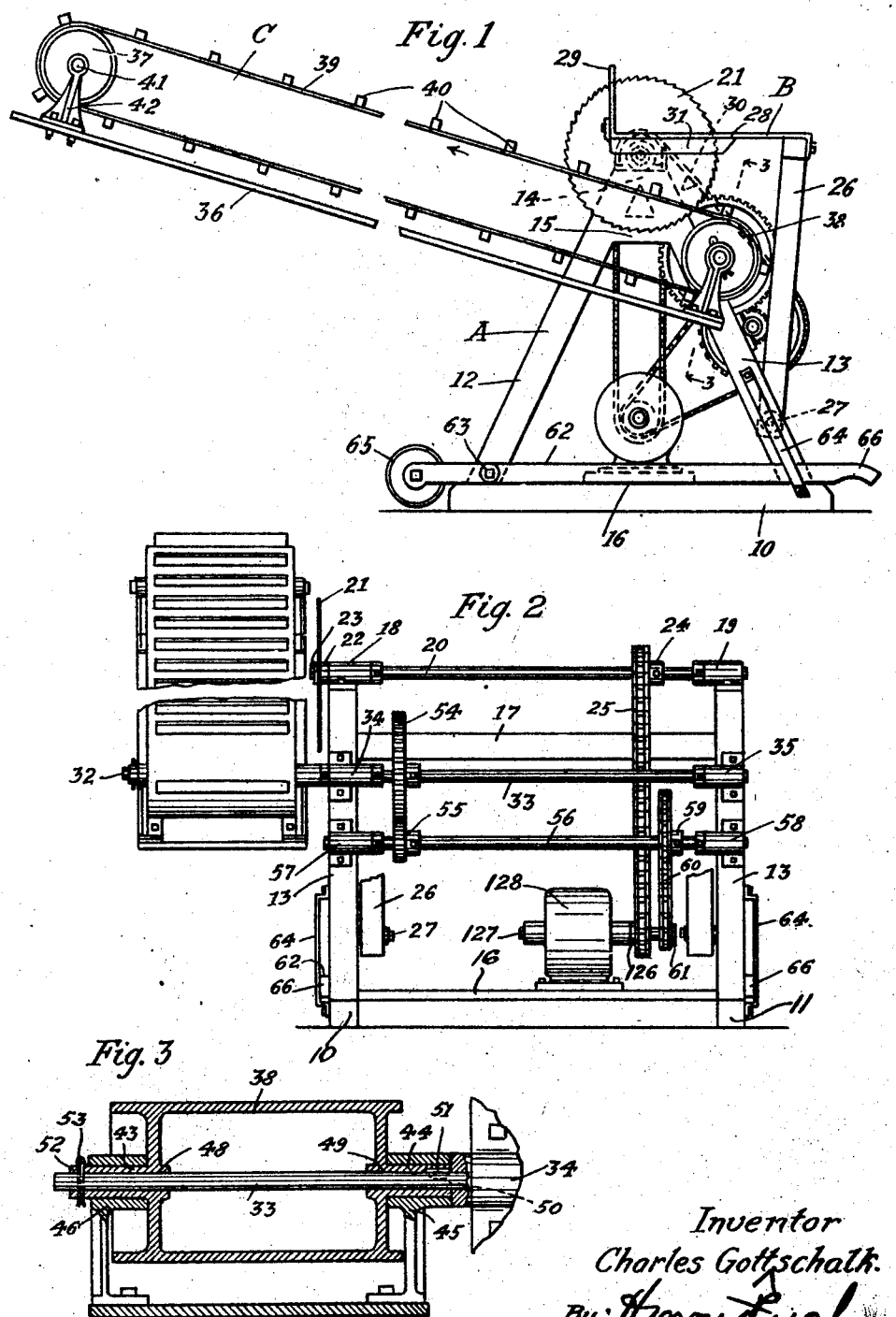
Inventor
Charles Gottschalk.
By. [signature]
his Attorney.

Patented May 11, 1926.

1,584,029

UNITED STATES PATENT OFFICE.

CHARLES GOTTSCHALK, OF ST. PAUL, MINNESOTA.

CORDWOOD SAW.

Application filed August 1, 1921. Serial No. 488,822.

My invention relates to cord wood saws and has for its object to provide a saw having a detachable conveyor mounted thereon which saw is adapted to discharge the wood sawed, upon the conveyor where the same can be conducted to any desired locality.

Another object of the invention is to construct the said conveyor so that the same may be bodily detached from the saw proper.

A still further object is to provide the saw with means whereby the same may be readily transported from one locality to another.

Another object is to provide means for driving both the saw and conveyor from the same source of power.

A still further object is to mount the saw upon an A-frame which is adapted to hold an electric motor or other suitable source of power within the same, said motor being arranged to simultaneously drive the saw and conveyor for removing the cut wood from the same.

A still further object is to position the reduction shafting across the forward legs of said A-frame so that the member driving the conveyor falls to the front of and below the saw proper so that the wood cut off is directly discharged upon the said conveyor.

The full objects and advantages of my invention will appear in connection with the detailed description thereof and are particularly pointed out in the claims.

In the drawings, illustrating the application of my invention in one form:—

Fig. 1 is a side elevational view of my improved invention.

Fig. 2 is a front elevational view of the device shown in Figure 1.

Fig. 3 is a cross sectional view taken on line 3—3 of Figure 1 and drawn to a larger scale.

In the drawings I have shown my invention as mounted on a frame A which consists of a pair of skid members 10 and 11 which are adapted to support the entire construction. These skid members each have upwardly extending standards 12 and 13 which meet at their upper ends as indicated at 14 to form a pair of A-frames, which members are interconnected by a cross bar 15 extending in between the same and parallel to the skid members 10. The two frame members so formed are connected to one another by means of a plank 16 which is secured to the upper portions of said skid members and at the top by means of a header 17 secured to the two bars 15 previously described. All of these parts are rigidly bolted together so that a substantial frame is provided.

Upon the upper portions 14 of standards 12 and 13 I secure two horizontally positioned bearings 18 and 19 which are adapted to journal a shaft or arbor 20 extending completely across the frame work. This shaft carries at one end a circular cross cut saw 21 which is held in place thereon by means of a flange 22 secured to said shaft and a nut 23 screwable upon the end of the same. Upon the shaft 20 adjacent the bearing 19 is rigidly secured a sprocket wheel 24 which is driven by a chain 25 passing over another sprocket wheel 26 which is secured to the shaft 27 of an electric motor 28. Motor 28 is positioned within the frame members A and rests upon the plank 16 which is secured to the skid members 10 and 11. If desired a gasoline engine may be used in place of the motor.

For feeding the cord wood saw against the saw 21 I provide a swinging table B which comprises a pair of uprights 26 pivoted to the lower portions of the standards 13 at 27. These uprights have connected across the upper portions thereof a table 28 on which the cord wood is adapted to be positioned. A rest 29 secured to table 28 serves as a back against which the wood may be placed in feeding the same across the saw. A pair of braces 30 are connected with the forward end of the table 28 and extend downwardly and are secured to the uprights 26 serving to hold the said table 28 in rigid relation to the said standards. This swinging table is of ordinary construction and serves to discharge the wood as the same is sawed over the end thereof. To prevent the wood from hitting the nut 23 of shaft 20 I provide a sloping guide 31 which directs the wood away from the same.

For removing the wood after the same is sawed by the saw 21 I provide a conveyor indicated in its entirety at C. This conveyor has one end thereof mounted on an extending portion 32 of a shaft 33 which is journalled in two bearings 34 and 35 secured to the uprights 13. Conveyor C is so positioned that as the pieces of wood are cut off by the saw 21 the same are adapted to drop on this conveyor and to be carried along with the same and discharged at the required locality.

The construction of conveyor C can best be seen from Figure 1. The entire conveyor is mounted upon a board or back 36 and consists principally of two pulleys 37 and 38 which carry an endless belt 39 passing over the same. Belt 39 is provided with a number of spaced cleats 40 which are adapted to catch the wood as the same is dropped upon the conveyor and carry the same along the upper portion of the conveyor. Pulley 37 is secured to a shaft 41 which is journalled in two bearings 42 secured to the back 36. The exact construction of pulley 38 is best seen in Figure 3. This pulley is provided with two hubs 43 and 44 which extend outwardly therefrom and serve as stub shafts by means of which the said pulley may be journalled in a pair of bearings 45 and 46 similar to bearings 42. These bearings are rigidly secured to the lower end of the back 36 and together with the bearings 42 hold the two pulleys 37 and 38 journalled for rotation with the belt 39 held in driving position thereon.

The before stated conveyor is detachably mounted on shaft 33 so that the same may be readily removed from said shaft for the purpose of carrying or transporting the entire saw from one locality to another. For accomplishing this the hubs 43 and 44 are bored at 48 and 49 to permit of sliding the said bosses over the shaft 33. A key 50 secured to shaft 33 near the bearing 34 is adapted to engage in a key-way 51 formed on the interior of hub 44 so that as the pulley 38 is slid over shaft 33 the said key-way may engage key 50 and thereby hold pulley 38 secured upon said shaft. For preventing the removal of this pulley from shaft 33 I employ a cotter-pin 52 which is adapted to extend completely through hub 43 and through a hole 53 drilled through the outer end of shaft 33. To remove the entire conveyor C it is merely necessary to extract cotter-pin 52 and draw the entire conveyor outwardly from shaft 33, after which the said conveyor remains detached from said saw with all the parts therein intact.

The means for driving conveyor C can best be seen in Figures 1 and 2. A spur gear 54 secured to shaft 33 meshes with a pinion 55 which is rigidly secured to a counter-shaft 56. Shaft 56 is journalled in two bearings 57 and 58 which are secured to the frame members 13 similar to the bearings 34 and 35. A sprocket 59 secured to shaft 56 is driven by a chain 60 which passes over a sprocket wheel 61 secured to shaft 27 of motor 28. By this means conveyor C is driven from motor 28. It will be noted that a spur gear drive is employed between shafts 35 and 56. This is for the purpose of causing the belt 39 to travel as indicated by the arrow in Figure 1 so as to cause the wood deposited upon the said conveyor C to travel upwardly and to be discharged off from the end of the same.

For transporting the saw about on the ground I provide a device which consists primarily in two bars 62 pivoted near one end to the frame members 12 at 63. These bars extend across frame A and have their forward ends slidably mounted between the uprights 13 and a pair of keepers 64 which are secured thereto. The extreme rearward end of bars 62 have pivoted to them wheels 65 which, when the bars 62 are raised upwardly to the extent of their travel within keeper 64, engage the ground and lift the forward ends of the said skid members 10 and 11 from the ground. A pair of handles 66 are formed in the end of bars 62 to facilitate lifting the device and wheeling the same about.

The use of the device is evident. A wagon may be drawn along side of a wood pile and wood sawed from the pile and directly discharged into the wagon. As the pile is consumed the saw rig may be transported about by means of the wheels 65 so as to minimize the number of steps between the pile and the saw rig. The conveyor C on account of its back 36 may be swung about on the shaft 33 to any elevation desired and deposited with said back on any suitable structure such as the side of a wagon body, a wooden horse, a box or any other means which may be available. With this type of construction no special support is required for the conveyor inasmuch as the cleats and the lower portion of the belt 39 cannot get in contact with the support since the back 36 completely covers the same along the entire bottom thereof. This makes the device fool-proof as the entire support can be taken from beneath the conveyor and the same simply dropped upon the ground.

The device is extremely simple in construction and is a complete unit which may easily be transported from one locality to another. The conveyor which is connected with this device forms an effective means for carrying away the wood after the same is sawed up so that the employment of additional labor for removing the wood is eliminated.

In accordance with the patent statutes I have described the principles of operation of my invention together with the apparatus which I now consider to represent the best embodiment thereof, but I wish to have it understood that the construction shown is only illustrative and that the invention can be carried out by other means and applied to uses other than those above set forth within the scope of the following claims.

I claim:—

1. A cord wood saw comprising an A-frame, a mandrel journalled to said frame at the apex thereof, a motor positioned within the base of said frame, a saw secured to said mandrel, a pair of counter-shafts mounted upon the forward frame members of said A-frame positioned forwardly of said mandrel, a conveyor mounted upon one of said counter-shafts and extending in the opposite direction from that of the rotation of the saw, having its lowermost end positioned below said mandrel and means for driving said mandrel and counter-shafts from said motor.

2. A cord wood saw comprising an A-frame, a mandrel journalled to said frame in the apex thereof, a motor positioned within the base of said frame, a vertically extending chain driving said mandrel from said motor, a shaft journalled on the sides of one pair of said frame members having an end protruding beyond said frame, a conveyor detachably mounted on the protruding end of said shaft, a counter-shaft journalled on the front frame members of said A-frame immediately below the said conveyor shaft, a gear mounted on said conveyor shaft, a pinion secured to said counter-shaft and meshing with said gear, a sprocket wheel mounted on said counter-shaft, and a chain adapted to drive said sprocket from said motor.

3. A cord wood saw comprising a plurality of pairs of sloping legs, a base connecting said legs, a motor on said base, a saw shaft at the top and apex of said legs, a conveyor shaft mounted on one leg of each pair and extending laterally beyond the frame formed of said pairs of legs and beyond said base, a pulley detachably mounted on said shaft to be driven thereby, means for connecting said shafts and said motor, a plurality of conveyor supporting arms pivoted on said pulley, and a member joining said arms.

In testimony whereof I affix my signature.

CHARLES GOTTSCHALK.